No. 645,060. Patented Mar. 13, 1900.
A. T. BECKLEY.
CAN OPENER.
(Application filed June 26, 1899.)
(No Model.)
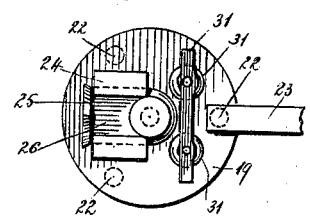
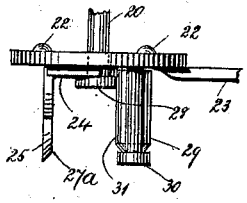
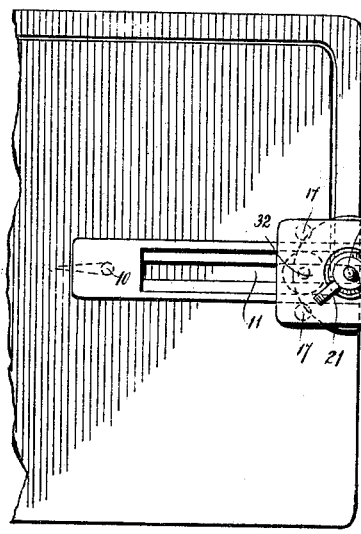
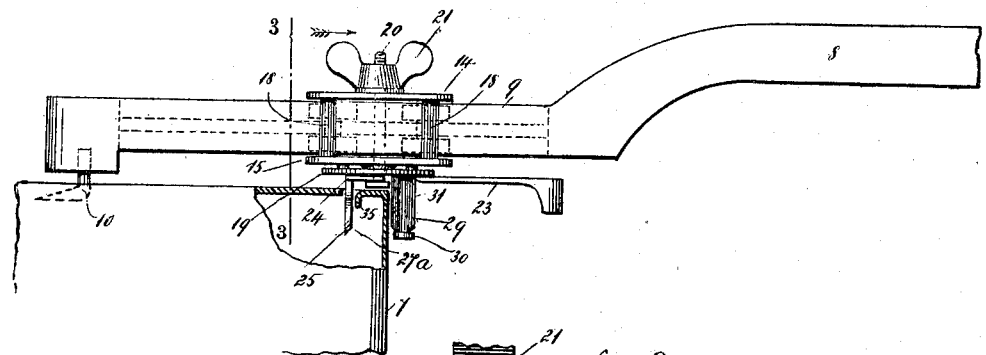
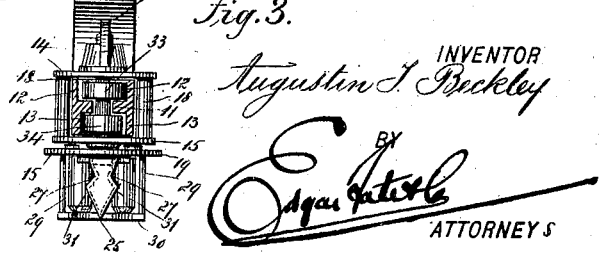
WITNESSES
INVENTOR
Augustin T. Beckley
BY
ATTORNEYS

UNITED STATES PATENT OFFICE.

AUGUSTIN THEODORE BECKLEY, OF IROQUOIS FARM, COSTA RICA.

CAN-OPENER.

SPECIFICATION forming part of Letters Patent No. 645,060, dated March 13, 1900.

Application filed June 26, 1899. Serial No. 721,988. (No model.)

*To all whom it may concern:*

Be it known that I, AUGUSTIN THEODORE BECKLEY, residing at Iroquois Farm, Costa Rica, have invented certain new and useful Improvements in Can-Openers, of which the following is a full and complete specification, such as will enable those skilled in the art to which it appertains to make and use the same.

This invention relates to can-openers; and the object thereof is to provide an improved device of this class which may be used to cut out the entire head of either a circular or angular can and to cut out the side of a sardine-box or similar vessel or receptacle; and with this and other objects in view the invention consists in the device hereinafter described and claimed.

The invention is fully disclosed in the following specification, of which the accompanying drawings form a part, in which—

Figure 1 is a plan view of my improved can-opener, and showing the method of the operation thereof; Fig. 2, a side view of the device as shown in Fig. 1, part of the construction being in section; Fig. 3, a section on the line 3 3 of Fig. 2; and Figs. 4 and 5, bottom and side views, respectively, of details of the construction.

In the drawings forming part of this specification, the separate parts of my improvement are designated by the same numerals of reference in each of the views, and in said drawings I have shown at 7 a cam which is angular in form, and in the practice of my invention I provide a device of the class described, which comprises a handle 8, provided with a shank 9, at the end of which is an angular prong or pin 10, which is adapted to be inserted through the head of the can centrally thereof.

The shank 9 of the handle 8 is provided with an oblong slot or opening 11, and at the top of said shank the said oblong slot or opening is formed into longitudinal rabbet-grooves 12, and at the bottom of said shank said oblong slot or opening is formed into corresponding longitudinal rabbet-grooves 13. I also provide a frame adapted to slide on the shank 9 of the handle 8 and consisting of a top plate 14 and a bottom plate 15, said plates being connected at each side by pins 17, and I also provide a blade-supporting plate 19, which is provided centrally with a screw-threaded shaft 20, which passes upwardly through said frame and through the slot or opening 11 in the shank 9 of the handle 8 and is provided at its upper end with a thumb-nut 21.

The frame through which the shank 9 of the handle 8 passes is preferably oblong in form, and the blade-supporting plate 19 is preferably circular in form, and said plate is provided on its upper side with spherical knobs or projections 22, which bear upon the bottom of the plate 15, and the shaft 20 is passed upwardly through the plate 19, as shown in Fig. 5, and said plate is adapted to turn on said shaft.

The plate 19 is provided at one side with a handle 23, which normally projects beneath the shank 9 of the handle 8 and in the direction of said handle 8, and said plate 19 is also provided with two parallel keepers 24, which serve to hold the blade 25 in position.

The blade 25 is pointed at its lower end and provided at its upper end with an angular portion 26, which in practice is inserted between the keepers 24, and said blade is provided near its upper end with a triangular notch or recess 27 at the opposite sides thereof, and the sides of said blade at the back thereof from the pointed lower end to the upper end are beveled, as shown at $27^a$ in Figs. 2 and 5.

As shown in the drawings, the shaft 20 is provided at its lower end with a head 28, which overlaps the angular extension 26 of the blade 25 and assists in holding the blade in position, and the knobs 22 on the upper side of the plate 19 facilitate the turning of said plate on the bottom of the plate 15 of the frame, of which said plate 15 forms a part.

Suspended transversely of the bottom of the plate 19 and between the handle 23 and the center of said plate, by means of hangers 29, is a bar 30, between which and the plate 19 are mounted rollers 31.

Mounted in the opposite end of the frame, which slides on the shank 9 of the handle 8, are pins 32, in each of which is mounted an upper roller 33 and a lower roller 34, and the rollers 33 move in the rabbet-grooves 12, while the lower rollers 34 move in the rabbet-grooves 13 in the top and bottom, respectively, in the shank 9 of the handle 8, and in the operation of the device, as hereinafter described, in cutting out the head of a square or angular can the removable frame on the shank 9 of the handle 8 is free to move in both directions on said shank, and in this operation the bottom rollers 34 will press on the side walls of the rabbet-grooves 13 at the right-hand side of the shank 9, while the rollers 33 will press on the side wall of the corresponding rabbet-grooves 12 at the left-hand side of said shank, according to the direction in which the handle 8 is moved and the width of the rabbet-grooves 12 and 13, and the diameter of the rollers 33 and 34 are such as to render this operation possible.

In the operation of this device the angular prong 10 is forced downwardly through the central portion of the head of the can, and the handle 8 is depressed, so that the rollers 31 are passed down outside of the head of the can, and the blade 25 will pass through the head of the can, as shown in Fig. 2, and the handle 8 may then be turned in either direction. In this operation the frame with which the blade 25 is connected is free to slide in both directions on the shank 9 of the handle 8, and the blade-carrying plate 19 is free to turn on the shaft 20, and the rollers 31 guide and facilitate the movement of the device around the perimeter of the can and hold the blade 25 closely adjacent to the sides of the can, and the head may thus be cut completely out. The rollers 31 also facilitate the turning of the device around a corner of the can and also the turning of the plate 19, so as to guide the blade 25, and the triangular notches or recesses 27 in the sides of the blade 25 facilitate the cutting out of the head of the can and hold the blade therein, and the shape of said blade is such, the edges thereof being beveled at the back, and that portion of the head of the can adjacent to the perimeter is turned downwardly, as shown at 35 in Fig. 2. This operation leaves a beveled edge on that portion of the head of the can which is not cut out, and the danger of cutting the hands or injuring the same thereon is obviated, and the can may be used for various purposes after it has been emptied.

The entire device is simple in construction and operation and perfectly adapted to accomplish the result for which it is intended, and is also comparatively inexpensive, and it will be apparent that by means of this device the head or one side of a can of any shape may be entirely cut out by operating the device as herein described.

Having fully described my invention, I claim as new and desire to secure by Letters Patent—

1. A can-opener, comprising a handle provided with a shank, a longitudinally-movable frame mounted thereon, a plate pivotally supported beneath said frame, a blade connected with said plate, and rollers suspended from said plate adjacent to said blade, substantially as shown and described.

2. A device of the class described, comprising a handle provided with a shank having a longitudinal slot or opening, and rabbet-grooves at the top and bottom thereof, a frame mounted on said shank and movable longitudinally thereof, pins mounted in said frame at each side of the center thereof, and provided with rollers movable in said rabbet-grooves, a rotatable plate mounted beneath said frame and provided with a handle, a blade depending therefrom, and guide-rollers mounted transversely of the bottom of said plate adjacent to said blade, substantially as shown and described.

3. A device of the class described, comprising a handle provided with a shank, a frame longitudinally movable on said shank, a blade-supporting plate rotatably connected with the bottom of said frame, a cutting-blade detachably connected with said plate adjacent to one side thereof, a handle radially connected with said plate adjacent to the opposite side, and guide-rollers suspended beneath said plate between said handle and said blade, substantially as shown and described.

4. A device of the class described, comprising a handle provided with a shank, an angular pin or prong connected with the end of said shank, a frame mounted on said handle and longitudinally movable thereon, a blade-supporting plate, a shaft passing upwardly through said plate and through said frame, and the shank of the handle, a thumb-nut on the upper end of said shaft, a blade connected with said blade-supporting plate, and guide-rollers connected with said plate adjacent to said blade, substantially as shown and described.

5. A device of the class described, comprising a handle provided with a shank having a longitudinal slot or opening, and rabbet-grooves communicating with said opening longitudinally thereof at the top and bottom of said shank, top and bottom rollers mounted in said frame and movable in said rabbet-grooves and adapted to bear on the opposite side walls thereof, a blade-supporting plate below said frame, a shaft passing upwardly through said plate and through said frame and through the shank of the handle on which the frame is mounted, said blade-supporting plate being provided adjacent to one side of the bottom thereof with a detachable blade, and at the opposite side with the radial handle, and depending guide-rollers connected with said plate between said handle and said blade, substantially as shown and described.

6. A device of the class described, comprising a handle provided with a shank, a frame longitudinally movable on said shank, a plate rotatably supported beneath said frame, a blade connected with the bottom of said plate near one side thereof, a radial handle connected with the opposite side of said plate, and depending guide-rollers suspended beneath said plate between said handle and said blade, substantially as shown and described.

In testimony that I claim the foregoing as my invention I have signed my name, in presence of the subscribing witnesses, this 8th day of June, 1899.

AUGUSTIN THEODORE BECKLEY.

Witnesses:
  LUIS ANDERSON,
  CHAS. S. CALDWELL.